United States Patent [19]
Pearlstine et al.

[11] Patent Number: 5,518,534
[45] Date of Patent: May 21, 1996

[54] INK SET AND PROCESS FOR ALLEVIATING BLEED IN PRINTED ELEMENTS

[75] Inventors: Kathryn A. Pearlstine, Wilmington; Loretta A. G. Page, Newark, both of Del.

[73] Assignee: E. I. Du Pont de Nemours and Company, Wilmington, Del.

[21] Appl. No.: 508,763

[22] Filed: Aug. 4, 1995

[51] Int. Cl.$^6$ .................................................. C09D 11/02
[52] U.S. Cl. ................. 106/20 R; 106/22 R; 106/23 R
[58] Field of Search ...................... 106/20 R, 22 R, 106/23 R

[56]  References Cited

U.S. PATENT DOCUMENTS

| | | | |
|---|---|---|---|
| 5,019,166 | 5/1991 | Schwarz | 106/22 |
| 5,085,698 | 2/1992 | Ma et al. | 106/20 |
| 5,091,005 | 2/1992 | Mueller et al. | 106/22 |
| 5,106,416 | 4/1992 | Moffatt et al. | 106/22 R |
| 5,116,409 | 5/1992 | Moffatt | 106/22 |
| 5,143,547 | 9/1992 | Kappele | 106/22 R |
| 5,145,519 | 9/1992 | Kappele | 106/22 R |
| 5,181,045 | 1/1993 | Shields et al. | 346/1.1 |
| 5,185,034 | 2/1993 | Webb et al. | 106/22 R |
| 5,198,023 | 3/1993 | Stoffel | 106/22 R |
| 5,273,573 | 12/1993 | Kappele | 106/22 K |

FOREIGN PATENT DOCUMENTS

| | | | |
|---|---|---|---|
| 0586079A1 | 3/1994 | European Pat. Off. | C09D 11/00 |
| 0633142A1 | 1/1995 | European Pat. Off. | B41M 5/00 |

*Primary Examiner*—Helene Klemanski

[57] ABSTRACT

An ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C.

21 Claims, No Drawings

INK SET AND PROCESS FOR ALLEVIATING BLEED IN PRINTED ELEMENTS

FIELD OF THE INVENTION

This invention relates to a method of making printed elements. More particularly, this invention relates to a method of making printed elements having reduced color bleed.

BACKGROUND OF THE INVENTION

There are many methods of making printed elements in which printing liquids are applied to a substrate to form an image. The term "printing liquid", as it is commonly understood in the art, means a colorant in a liquid media, as distinguished from solid and dry colorants, and includes paint, toners, inks, etc. The liquid media may be an organic solvent ("solvent based") or water ("aqueous based"). The colorant may be a dye or a pigment. Other ingredients typically are present in the printing liquid, depending upon the particular printing technique being employed.

Exemplary methods of using printing liquids include gravure and press printing, xerographic techniques using liquid toners, and ink jet printing, to name but a few. Of these methods, ink jet printing has become increasingly popular, particularly for so-called "desk-top publishing" applications, because of its ability to make multi-color prints by introducing three or four primary inks on a substrate in a single pass. Other printing methods generally require at least one pass through the printer for each primary color.

Despite the breadth of techniques available for making printed elements, a common problem can arise when a multi-colored element is desired in which a printing liquid of one color is placed in abutting relationship to a printing liquid of another color. This problem is manifested in a mixing or "bleeding" of the two printing liquids at their interface, whereby the line of demarcation between the two printing liquids is obscured. Bleeding may cause undesired color formation at the interface and a concurrent loss of resolution, color separation, edge acuity and color purity in the image. The more contrasting the two adjacent liquids are in color (such as black and yellow), the more visual the bleed. Bleed is also particularly noticeable when the mixing of two inks produces a secondary color, such as when blue and yellow mix to produce green.

Bleed is a particular problem in ink jet printing because the relatively low viscosity inks used therein tend to spread and because ink jet printers have the capability of printing three or four primary colors in simultaneous (or near simultaneous) fashion.

Several methods have been proposed to prevent bleed of adjacent printing liquids. The most obvious method is to apply the two printing liquids at a distance from one another such that no intermingling or mixing of the printing liquids can occur. This method is not a solution to the problem, however, and produces images having poor resolution.

Another method, and the one most commonly used, involves delay in applying the second printing liquid until the first printing liquid is completely dry. This method is also disadvantageous, not only because of its inefficiencies, but also because it is not particularly effective. For example, it has been observed that bleed may occur even if the first printing liquid is dry, which is believed to be caused by the colorants of the first printing liquid becoming "redissolved" in the liquid medium of the second printing liquid. Thus, the more soluble the components of the first printing liquid in the liquid medium, the more likely bleed will occur even if the first printing liquid is dry. This method is particularly disadvantageous in ink jet printing applications because it places an arbitrary limitation on the efficiency of generating multi-colored prints.

U.S. Pat. No. 5,091,005 teaches that the addition of formamide to the inks will reduce the occurrence of bleed in some circumstances. Yet another approach to control bleed is to increase the rate of penetration of the printing liquid into the substrate, which has its own shortcomings. First, it is inherently limited to those printing applications using particular printing liquid/substrate combinations. For example, highly absorbant substrates may be required to control bleed. Second, bleed will still be apparent unless the first printing liquid becomes bound to the substrate such that it will not be dissolved by the liquid medium of the second printing liquid. Third, known ways of increasing penetration have disadvantages in that they have a tendency to degrade text quality.

A combination of the above approaches is disclosed in U.S. Pat. No. 5,116,409, which discloses use of zwitterionic surfactants or non-ionic amphiphiles in concentrations above their respective critical micelle concentration. The formation of micelles containing dye molecules is said to prevent the dye molecules in each ink from mixing.

U.S. Pat. No. 5,181,045 teaches a method of ink jet printing wherein one of inks contains a dye that becomes insoluble under defined pH conditions and the other ink has a pH that renders the dye contained in the first ink insoluble. This method is inherently limited, however, to a specific group of dyes as colorants. In addition, the ink formulations are also constrained by the need for pH buffers, for example, which further limits the utility of that method.

EP 0586 079 A1 discloses a method for preventing color bleed between two different color ink compositions wherein the first ink is anionic and comprises a coloring agent which includes one or more carboxyl and/or carboxylate groups, and the second ink includes a precipitating agent which is designed to ionically crosslink with the coloring agent in the first ink to form a solid precipitate in order to prevent bleed between the two ink compositions. Multivalent metal salts are disclosed as being useful as the precipitating agent. Although this approach provides effective bleed control for two inks, it provides problems when more than two inks are applied to a printing medium in generating a multicolor print. Further, this approach is very limiting because it does not allow for flexibility in the choice of coloring agent in the first ink which has to have one or more carboxyl and/or carboxylate groups capable of ionically bonding with the precipitating agent in the second ink.

Dyes are a common colorant used in ink jet printing due to their solubility in water. In addition, dyes provide vibrant chromatic colors on plain paper. Unfortunately, however, many dyes possess poor resistance to light, water and handling on paper. Consequently, dye colorants have deficiencies for archiving print samples.

Pigment colorants have been used as an alternative for dyes since they generally possess excellent light and water fastness. However, most pigments do not achieve the same color intensity (i.e., "chroma") on plain paper as dyes.

One approach to improve pigment chroma is to employ a vehicle that holds the colorant on the paper surface rather than allowing the pigment to diffuse into the paper. Such vehicles tend not to penetrate into the paper, however, and are not adapted for quick drying or bleed control.

Another approach to improving pigment chroma is to use a specially coated media which helps keep the colorant on the surface of the paper. However, such media typically is more expensive than paper. Furthermore, one is restricted to printing only with the special media.

Accordingly, there is a need for an improved method for printing multi-colored images that does not present the bleed problem discussed above. Moreover, there is a particular need for such an improved method that achieves the favorable color chroma that may be obtained with dye colorants on plain paper, while providing the excellent resistance to water and light obtainable with pigment colorants.

SUMMARY OF THE INVENTION

It now has been found that bleed between two adjacent inks on a printing medium may be reduced by selecting inks having the same ionic character, at least one ink being a pigmented ink and including in one of the inks an organic acid or mineral acid salt having a solubility of at least 10 parts in 100 parts of water at 25° C. Accordingly, in one embodiment the present invention provides an ink set for alleviating bleed in multicolor printed elements comprising a first ink and a second ink of the same ionic character, each ink having an aqueous carrier medium and a colorant; wherein the colorant in the first ink is a pigment dispersion and the second ink contains a salt of an organic acid or mineral acid having a solubility of at least 10 parts in 100 parts of water at 25° C.

In another embodiment, the invention provides a process for creating a multicolor printed element having reduced color bleed comprising:

(a) providing a first ink comprising an aqueous carrier medium and a pigment colorant;

(b) providing a second ink of the same ionic character as said first ink, said second ink comprising an aqueous carrier medium, a colorant and a salt of an organic acid or a mineral acid having a solubility of at least 10 parts in 100 parts of water at 25° C.; and (c) applying the first ink and the second ink in contact with each other.

While the invention may be used in a variety of applications, it is particularly well adapted for use in ink jet printing, more specifically in thermal ink jet printing applications. While the inks typically will be applied in abutting relationship on the medium, the inks also may be applied in an overlay relationship.

DETAILED DESCRIPTION OF THE INVENTION

The invention now will be described in detail with particular reference to aqueous ink jet ink compositions, while it has application with other printing liquids and in other printing techniques.

Aqueous cationic and anionic inks suitable for use in this invention have an aqueous carrier medium and contain a colorant, which may be a pigment dispersion or a dye, or combinations thereof. The first ink must contain a pigment dispersion, but the second ink may contain a pigment dispersion or a dye (or combination) as the colorant. It has been found that the advantages of reduced bleed characteristics in the printed element are observed in such combinations, wherein the inks are in abutting relationship to one another, as long as the second ink jet ink contains the requisite salt of an organic acid or a mineral acid having a solubility of at least 10 parts in 100 parts of water at 25° C. The first and second inks also have the same ionic character, i.e. both the first and second inks are cationic or anionic. When two cationic inks are used, the dispersants must be neutralized with two different acids or quaternizing agents. The reactivity of the two neutralizing agents must be sufficiently different that one dispersion is destabilized by the addition of a particular salt at a particular level of addition and the other dispersion is not destabilized. It has also been found that the advantages of improved color in the printed element are observed in such combinations, wherein the inks are in overlay relationship to one another, as long as the second ink jet ink contains the requisite salt of an organic acid or a mineral acid having a solubility of at least 10 parts in 100 parts of water at 25° C. The resulting printed images are of high quality in that individual dots are round with sharp edges, and there is little feathering or strike through.

INK COMPOSITION

As mentioned above, the first and second aqueous ink jet inks suitable for use in the present invention must have the same ionic character, i.e. both inks are either cationic or anionic. In either case, the inks have an aqueous carrier medium and a colorant, which may be either a pigment dispersion, a dye, or combinations thereof, provided that the colorant in at least the first ink is a pigment dispersion. The inks may also contain other additives as mentioned below or known in the art of ink jet printing.

AQUEOUS CARRIER MEDIUM

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. The preferred compositions are approximately 60% to about 95% water, based on the total weight of the aqueous carrier medium.

The amount of aqueous carrier medium in the ink is in the range of approximately 70 to 99.8%, preferably 94 to 99.8%, based on total weight of the ink when an organic pigment is selected; approximately 25 to 99.8%, preferably 70 to 99.8% when an inorganic pigment is selected; and 80 to 99.8% when a dye is selected.

COLORANTS

The colorants useful in the present invention may be a pigment dispersion or a dye. A pigment is a colorant that is applied in an insoluble particulate state. A dye is a colorant that is applied in a soluble state.

PIGMENT DISPERSION

The term pigment dispersion, as is known in the art and as used herein, refers to a mixture of a pigment and a dispersing agent. Preferably, the dispersing agent is a polymeric dispersant compound.

Pigments

Useful pigments for the dispersion comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in U.S. Pat. No. 5,085,698.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Dispersant

Polymeric dispersants are preferred and include, but are not limited to, AB, BAB or ABC block copolymers.

In AB or BAB block copolymers the A segment is a hydrophobic homopolymer or copolymer which serves to link with the pigment and the B block is a hydrophilic homopolymer or copolymer, or salts thereof, and serves to disperse the pigment in the aqueous medium. Such polymeric dispersants and the synthesis thereof are disclosed in Ma et al., U.S. Pat. No. 5,085,698.

ABC triblocks are also useful as pigment dispersants. In the ABC triblock, the A block is a polymer compatible with water, the B block is a polymer capable of binding to the pigment and the C block is compatible with the organic solvent. The A and C blocks are end blocks. ABC triblocks and their synthesis are disclosed in Ma et al., EPO Publication 0556649 published Aug. 25, 1993.

Although random copolymers can be used as dispersing agents, they are not as effective in stabilizing pigment dispersions as the block polymers, and therefore are not preferred. Useful are random interpolymers which have narrowly controlled molecular weight ranges preferably having poly dispersivities of 1-3. preferably 1-2. These polymers are substantially free of higher molecular weight species that readily plug pen nozzles. Number average molecular weight must be less than 10,000 Daltons, preferably less than 6,000, most preferably less than 3,000. As with the above-described block polymers, these random polymers contain hydrophobic and hydrophilic monomer units. Commercial random dispersant polymers will plug pen nozzles readily. The molecular weight control can be readily obtained by using the Group Transfer Polymerization technique, but other methods that deliver low dispersivity also may be used.

Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl [meth]acrylate and salts thereof. Also quaternary salts of dimethylaminoethyl [meth]acrylate may be employed.

DYES

Dyes useful in this invention include anionic, cationic, amphoteric and non-ionic dyes well known in the art. Anionic dyes are those dyes which, in aqueous solution, yield colored anions and cationic dyes are those which, in aqueous solution, yield colored cations. Typically anionic dyes contain carboxylic or sulfonic acid groups as the ionic moiety and encompass all acid dyes. Cationic dyes usually contain quaternary nitrogen groups and encompass all basic dyes.

The types of anionic dyes most useful in this invention are Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known in the art.

The color and amount of dye used in the ink composition is largely a function of choice, being primarily dependent upon the desired color of the print achieved with the ink, the purity of the dye and its strength. Low concentrations of dye may not give adequate color vividness. High concentrations may result in poor printhead performance or unacceptably dark colors. The dye is present in the amount of 0.01 to 20% by weight, preferably 0.05 to 8% by weight, more preferably 1 to 5% by weight, based on the total weight of the ink.

In the case of organic pigments, the ink may contain up to approximately 30% pigment by weight, but will generally be in the range of approximately 0.1 to 15%, preferably 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

SALT OF ORGANIC OR MINERAL ACID

The second ink contains a salt of an organic or mineral acid having a solubility of at least 10 parts in 100 parts of water at 25° C. Selection of the particular salt will vary with the specific combination of inks, and is readily achieved through routine experimentation.

The organic acids may be carboxylic acids, particularly those carboxylic acids substituted with electron withdrawing groups, and organic sulfonic acids. Some examples of such acids include chloroacetic acid, p-toluene sulfonic acid, sulfanilic acid, benzene sulfonic acid, etc. The mineral acid may be hydrochloric acid, phosphoric acid, sulfuric acid, hydrobromic acid, nitric acid, hydriodic acid, hydrofluoric acid, etc. The salt may be a metal salt, which is either mono-valent or multivalent, or it may be an ammonium salt. The metal salt comprises a metal cation selected from the group consisting of $Na^{+1}$, $Li^{+1}$, $K^{+1}$, $Ca^{+2}$, $Cu^{+2}$, $Co^{+2}$, $Ni^{+2}$, $Fe^{+2}$, $La^{+3}$, $Nd^{+3}$, $Y^{+3}$, $Zn^{+2}$, $Mg^{+2}$, $Al^{+3}$, etc. Some combinations of anions, and cations may require special handling.

Some suitable salts of organic or mineral acids include $NaCl$, $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $Zn(NO_3)_2$, $CuCl_2$, $ZnCl_2$, $CoCl_2$, $Co(NO_3)_2$, $NiCl_2$, $MgBr_2$, $Mg(NO_3)_2$, $ZnBr_2$, $NH_4Cl$, $Ni(NO_3)_2$, p-toluene sulfonic acid, Na salt; benzene sulfonic acid, Na salt; and sulfanilic acid, Na salt. The salts of organic or mineral acids are present in the amount of 0.1 to 15%, preferably 0.5 to 10% by weight, based on the total weight of the ink composition.

OTHER INGREDIENTS

The ink compositions also may contain other ingredients. For example, surfactants may be used to alter surface tension as well as maximize penetration. However, surfactants may destabilize the pigment dispersion or cause an increase in the amount of bleed. Accordingly, the use of surfactants may tend to negate the advantages offered by the present invention. However, if it is otherwise desirable or necessary for a surfactant to be present, it has been discovered that the adverse effects of the surfactant on bleed can be minimized or eliminated by adding a salt of an organic acid or a mineral acid per the invention.

Biocides may be used in the ink compositions to inhibit growth of microorganisms, as is well known in the art. In addition, sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions as is known in the art.

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, a 2 roll mill, an attritor, or by passing the mixture through a plurality of nozzles within a liquid jet interaction chamber at a liquid pressure of at least 5000 psi to produce a uniform dispersion of the pigment particles in the aqueous carrier medium. Other cosolvents may be present during the dispersion step.

If a dye is used as the colorant in the second ink, there is no dispersant present and no need for pigment deaggregation. The dye-based ink is prepared in a well agitated vessel rather than in dispersing equipment.

MULTIPLE COLORS

For printing applications requiring more than two colors, the present invention may be used by providing three or more inks, in which 2 or more contain the requisite salts of the invention. The first ink is selected so that it will be incompatible with the salt present in the second and third inks. The amount or type of salt present in the second ink is different from that present in the third ink. The second ink is selected to be incompatible with the salt present in the third ink.

Alternately, this method may be used in combination with other known means of flocculating, precipitating or fixing ink.

INK PROPERTIES

Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out speedily and surely. The printed ink images have clear color tones, high density, excellent water resistance and light fastness. Further the ink does not corrode parts of the ink jet printing device it comes in contact with, and it is essentially odorless, and non-toxic.

SUBSTRATES

Substrates that may be selected in practicing this invention include all of those commonly used in generating printed elements. For ink jet ink applications, cellulose and non-cellulose type substrates may be used to advantage, with the cellulose type substrates, such as paper, being preferred. If sized, the degree of sizing for the substrate can be from 1 second to 1000 seconds as measured by the Hercules size test (HST), as described in TAPPI standards T530 PM-83. The substrate is chosen so its HST value is compatible with the volume and composition of the ink drop in the printer to be used. The preferred HST is in the range of 200 to 500 seconds, most preferably 350 to 400 seconds. Some useful papers include 100% bleached kraft composed of a blend of hard and soft wood, 100% wood free cotton vellum, and wood containing paper made translucent either by pulp beating or with additives. A preferred paper is Gilbert Bond paper (25% cotton) designated style 1057, manufactured by Mead Company, Dayton, Ohio. Other substrates include cardboard, transparent films such as polyethylene terephthalate, fabrics, etc.

This invention will now be further illustrated, but not limited by the following examples.

EXAMPLES

The polymeric dispersants were prepared using the following procedure:

Polymer Preparation 1

This shows the preparation of a cationic polymer, BZMA//DMAEMA (10//20) diblock polymer.

A 12-liter flask was equipped with a mechanical stirrer, thermometer, $N_2$ inlet, drying tube outlet, and addition funnels. Tetrahydrofuran THF, 4002 gms., and p-xylene, 7.7 gms., were charged to the flask. The catalyst tetrabutylammonium m-chlorobenzoate, 2.0 ml of a 1.0M solution in acetonitrile, was then added. Initiator, 1-methoxy-1-trimethylsiloxy-2-methyl propene, 155.1 gms. (0.891M) was injected. Feed I [2-dimethylaminoethyl methacrylate DMAEMA, 2801 gms. (17.8M)] was started at 0.0 minutes and added over 45 minutes. One hundred minutes after Feed I was completed (over 99% of the monomers had reacted) Feed II [benzyl methacrylate, 1568 gms. (8.91M) was started and added over 30 minutes.

At 400 minutes, 310 gms. of dry methanol were added to the above solution and distillation wasbegun. A total of 1725 gms. of solvent were removed. I-propanol, 1783 gms, was added after completion of the distillation. This made a BZMA//DMAEMA 10//20 diblock polymer at 49.6% solids and a Mn=5000.

Polymer Preparation 2.—Quaternization of the BZMA//DMAEMA 10//20 diblock polymer with Benzyl Chloride.

This shows how the polymer BzMA//DMAEMA 10//20 prepared in Preparation 1 was quaternized with benzyl chloride.

The polymer was made as described in Polymer Preparation 1 except that tetrahydrofuran, 1600.3 gms., and mesitylene, 2.1402 gms., and initiator, 1-methoxy-1-trimethylsiloxy-2-methyl propene, 62 gms. (0.891M) were charged to the flask. The catalyst tetrabutyl ammonium m-chlorobenzoate, 2.0 ml of a 1.0M solution in acetonitrile, was then added. Feed I [2-dimethylaminoethyl methacrylate DMAEMA, 1120.4 gms. (17.8M)] was started at 0.0 minutes and added over 30 minutes. One hundred twenty minutes after Feed I was completed (over 99% of the monomers had reacted). Feed II [benzyl methacrylate, 627.2 gms. (8.91M) was started and added over 30 minutes.

At 300 minutes, 124 gms. of dry methanol were added to the above solution and distillation begins. A total of 711.5 gms. of solvent was removed. I-propanol, 711.4 gms., was added after completion of the distillation. Benzyl chloride, 810.0 grams, was added along with an additional 605.6 gms of I-propanol and the polymer solution was heated under reflux. This made a BZMA//DMAEMA-BzCl (10//20) diblock polymer at 55.24% solids and a Mn=5000. The amine group was now quaternized and had a benzyl group attached to it. A chloride ion was the counter ion.

Polymer Preparation 3

The BMA/MMA//MAA (10/5//10) AB block copolymer was prepared using the following procedure:

A 12-liter flask was equipped with a mechanical stirrer, thermometer, N2 inlet, drying tube outlet, and addition funnels. Tetrahydrofuran THF, 3027 gms., and p-xylene, 6.2 gms., were charged to the flask. The catalyst tetrabutyl ammonium m-chlorobenzoate, 2.5 ml of a 1.0M solution in acetonitrile, was then added. Initiator, 1,1-bis(trimethylsiloxy)-2-methyl propene, 234.4 gms. (1.01M) was injected. Feed I [tetrabutyl ammonium m-chlorobenzoate,2.5 ml of a 1.0M solution in acetonitrile] was started and added over 150 minutes. Feed II [trimethylsilyl methacrylate, 1580 gms. (10.0M)] was started at 0.0 minutes and added over 30 minutes. One hundred and twenty minutes after Feed II was completed (over 99% of the monomers had reacted), Feed III [butyl methacrylate, 1425 gms. (10.0M), and methyl methacrylate, 503 gms. (5.0M)] was started and added over 30 minutes.

At 320 minutes, 650 gms. of dry methanol were added to the above solution and distillation was begun. During the first stage of distillation, 1250.0 gms. of material with a boiling point of below 55° C. were removed from the flask. The theoretical amount of methoxytrimethylsilane (BP=54° C.) to be removed was 1144.0 gms. Distillation continued during the second stage while the boiling point increased to 76° C. I-propanol, 1182 gms, total, was added during the second stage of distillation. A total of 2792 gms. of solvent were removed.

This made a butyl methacrylate/methyl methacrylate//methacrylic acid BMA/MMA//MAA (10/5//10) AB block polymer of 2900 Mn and 52.27% solids.

Polymer Preparation 4

The BMA/AMPS 90/10 random copolymer is prepared using the following procedure:.

A 1-liter flask is equipped with a mechanical stirrer, thermometer, N2 inlet, drying tube outlet, and addition funnels. Dimethylformamide DMF, 70 gm, butyl methacrylate BMA, and 2-acrylamido-2-methylpropanesulfonic acid, sodium salt, AMPS are charged to the flask. The solution is purged with nitrogen, and heated to 60° C. Azo-bis-isobutyronitrile, AIBN, is added. The solution is stirred at 60° C. for 20 hours.

This makes a butyl methacrylate/2-acrylamido-2-methylpropanesulfonic acid, sodium salt BMA/AMPS random copolymer.

Polymer Preparation 5

BMA//DMAEMA 5//10 diblock polymer was prepared using the following procedure:

A 3-liter flask was equipped with a mechanical stirrer, thermometer, N2 inlet, drying tube outlet, and addition funnels. Tetrahydrofuran THF, 1214 gm, and p-xylene, 7.1 gm, were charged to the flask. The catalyst tetrabutyl ammonium m-chlorobenzoate, 2.0 ml of a 1.0M solution in acetonitrile, was then added. Initiator, 1-methoxy-1-trimethylsiloxy-2-methyl propene, 77.6 gm (0.446M) was injected. Feed I [2-dimethylaminoethyl methacrylate DMAEMA, 700 gm (4.46M)] was started at 0 0 minutes and added over 45 minutes. One hundred minutes after Feed I was completed (over 99% of the monomers had reacted) Feed II [butyl methacrylate, 318 gm (2.24M) was started and added over 30 minutes.

At 400 minutes, 57 gm of dry methanol were added to the above solution and distillation begun. A total of 614 gm of solvent were removed. I-propanol, 438 gm, was added after completion of the distillation. This made a BMA//DMAEMA 5//10 diblock polymer at 48.1% solids and a Mn=2480.

Pigment dispersions were prepared using the following procedure:

Dispersion preparation 1

A cationic magenta pigment dispersion was prepared using a BZMA//DMAEMA-BzCl (10//20) diblock polymer and a 2 roll mill and the following procedure:

The following ingredients were mixed:

| INGREDIENT | AMOUNT (GM) |
|---|---|
| Polymer from preparation 2 (55.24% solids) | 316 |
| Quinacridone magenta pigment | 180 |
| (R-122 from Sun Chemical Corp | |
| Cincinnati, OH.) | |
| Diethylene glycol | 16 |

This mixture was then charged to a 2 roll mill and processed for 30 minutes. This made a pigment dispersion that contained 48.37% pigment and 46.9% quaternized polymer. It had a P/D=1.5/1.

An aqueous pigment dispersion concentrate was prepared by mixing the following ingredients with adequate stirring:

| INGREDIENT | AMOUNT (GM) |
|---|---|
| Pigment dispersion | 100 |
| Deionized water | 300 |

This made an aqueous, pigment concentrate that contained 11.35% pigment and had 90 mole % of the amine groups from the polymer quaternized with benzyl chloride.

Dispersion preparation 2

Dispersion preparation 2 was prepared as described in Dispersion preparation 1 with the following exceptions: the following ingredients were mixed:

| INGREDIENT | AMOUNT (GM) |
|---|---|
| Polymer from preparation 1 (55.91% solids) | 214.6 |
| Quinacridone magenta pigment | 180.0 |
| (R-122 from Sun Chemical Corp | |
| Cincinnati, OH.) | |

This mixture was then charged to a 2 roll mill and processed for 30 minutes. This made a pigment dispersion that contained 60% pigment and 40% polymer. It had a P/D=1.5/1. This 2 roll mill chip was then dissolved using phosphoric acid as the neutralizing agent to make an aqueous pigment concentrate.

An aqueous pigment dispersion concentrate was prepared by mixing the following ingredients with adequate stirring:

| INGREDIENT | AMOUNT (GM) |
|---|---|
| Pigment dispersion | 80.00 |
| Phosphoric acid (86.0%) | 13.14 |
| Deionized water | 307.00 |

Additional water was added to give an aqueous pigment concentrate that contained 11.01% pigment and had 90 mole % of the amine groups from the polymer neutralized with phosphoric acid.

Dispersion preparation 3

A cationic yellow pigment dispersion was prepared using a BZMA//DMAEMA (10//20) diblock polymer and a 2 roll mill and the following procedure:

The following ingredients were mixed:

| INGREDIENT | AMOUNT (GM) |
|---|---|
| Polymer from preparation 1 (50.22% solids) | 498 |
| Diarylide yellow pigment | 250 |
| (Y-14 from Sun Chemical Corp Cincinnati, OH.) | |

This mixture was then charged to a 2 roll mill and processed for 60 minutes. This made a pigment dispersion that contained 50% pigment and 50% polymer. It had a P/D=1/1. This 2 roll mill chip was then dissolved using phosphoric acid as the neutralizing agent to make an aqueous pigment concentrate.

An aqueous pigment dispersion concentrate was prepared by mixing the following ingredients with adequate stirring:

| INGREDIENT | AMOUNT (GM) |
|---|---|
| Pigment dispersion | 120.0 |
| Phosphoric acid (86%) | 24.5 |
| Deionized water | 255.0 |

Additional water was added to give an aqueous pigment concentrate that contained 11.36% pigment and had 90 mole % of the amine groups from the polymer neutralized with phosphoric acid.

Dispersion preparation 4

A yellow pigment dispersion neutralized with paratoluene sulfonic acid was prepared as described Dispersion preparation 3 with the following exception: the following ingredients were mixed:

| INGREDIENT | AMOUNT (GM) |
|---|---|
| Polymer from preparation 1 (50.22% solids) | 493 |
| Diarylide yellow pigment | 250 |
| (Y-14 from Sun Chemical Corp) | |
| Cincinnati, OH.) | |

This mixture was then charged to a 2 roll mill and processed for 30 minutes. This made a pigment dispersion that contained 50% pigment and 50% polymer. It had a P/D=1/1.

An aqueous pigment dispersion concentrate was prepared by mixing the following ingredients with adequate stirring:

| INGREDIENT | AMOUNT (GM) |
|---|---|
| Pigment dispersion | 80.00 |
| p-toluene sulfonic acid, monhydrate | 15.17 |
| Deionized water | 305.00 |

Additional water was added to give an aqueous pigment concentrate that contained 10.32% pigment and had 90 mole % of the amine groups from the polymer neutralized with p-toluene sulfonic acid.

Dispersion preparation 5

A cationic cyan pigment dispersion was pepared using a BZMA//DMAEMA-BzCl (10//20) diblock polymer and a Microfluidizer.

The following ingredients were mixed:

| INGREDIENT | AMOUNT (GM) |
| --- | --- |
| Polymer from preparation 2 (55.24% solids) | 181 |
| Cu phthalocyanine cyan pigment (PB 15:3- from BASF Corp, Parsippany, NJ) | 150 |
| Distilled water | 719 |

This mixture was then passed through a microfluidizer (Microfluidics Corp, Newton, Mass.). This made a pigment dispersion that contained 60% pigment and 40% polymer. It had a P/D=1.5/1 and contained 14.3% pigment.

Dispersion Preparation 6

An anienic black pigment dispersion is prepared using a BMA/MMA//MAA diblock polymer and a 2 roll mill.

The following ingredients were mixed:

| INGREDIENT | AMOUNT (GM) |
| --- | --- |
| Polymer from preparation 3 (52.27% solids) | 143.49 |
| Carbon Black pigment (Cabot) | 225.00 |
| Diethylene glycol | 30.00 |

This mixture is then charged to a 2 roll mill and processed for 30 minutes at 65.6° C. (150° F.). This makes a pigment dispersion that contains 75% pigment and 25% polymer. It has a P/D=3/1. This 2 roll mill chip is then dissolved using potassium hydroxide as the neutralizing agent to make an aqueous pigment concentrate.

An aqueous pigment dispersion concentrate is prepared by mixing the following ingredients with adequate stirring:

| INGREDIENT | AMOUNT (GM) |
| --- | --- |
| Pigment dispersion | 59.54 |
| Potassium hydroxide (45.9%) | 5.62 |
| Deionized water | 334.85 |

This gives an aqueous pigment concentrate that contains 10.14% pigment and had 90 mole % of the acid groups from the polymer neutralized with potassium hydroxide.

Dispersion Preparation 7

This shows the preparation of an anionic yellow pigment dispersion using a BMA/AMPS-sodium salt polymer and a 2 roll mill.

A yellow pigment dispersion is prepared using the following procedure:

The following ingredients are mixed:

| INGREDIENT | AMOUNT (GM) |
| --- | --- |
| Polymer from Preparation 4 (52% solids) | 143 |
| Monoarylide yellow pigment (Y-17 from Hoechst Celanese, Coventry, RI) | 225 |
| Diethylene glycol | 30 |

This mixture is charged to a 2 roll mill and processes for 30 minutes at 150F. This makes a pigment dispersion that contains 75% pigment and 25% polymer. It has a P/D=3/1. The 2-roll mill chip is then dissolved in water.

Control 1

A magenta ink was prepared by mixing the following ingredients:

| INGREDIENT | AMOUNT (%) |
| --- | --- |
| Pigment Dispersion 1 | 17.62 |
| 2-ethyl-2(hydroxymethyl)-1,3-propanediol | 18.00 |
| Deionized water | 64.37 |

A yellow ink was prepared by mixing the following ingredients:

| INGREDIENT | AMOUNT (%) |
| --- | --- |
| Pigment Dispersion 3 | 26.4 |
| 2-ethyl-2(hydroxymethyl)-1,3-propanediol | 18.0 |
| Deionized water | 55.6 |

The magenta and yellow inks were printed in overlapping and abutting relationship to each other using a Hewlett-Packard 500C printer printing onto Gilbert Bond paper (25% cotton, Mead Co. Dayton, Ohio). Bleed was rated on a scale of A–F with A being the best and F being the worst.

Bleed for this print was rated an F.

Example 1

Inks were made as described in Control 1 with the following exceptions: the yellow ink had the following composition.

| INGREDIENT | AMOUNT (%) |
| --- | --- |
| Pigment Dispersion 3 | 26.4 |
| 2-ethyl-2(hydroxymethyl)-1,3-propanediol | 18.0 |
| Deionized water | 43.6 |
| Sodium salt of benzene sulfonic acid | 12.0 |

Bleed was measured as described in Control 1. Bleed between colors was substantially reduced as compared to the control with no salt and was rated an A–.

Example 2

The sodium salt of sulfanilic acid was added to a mixture of 30% 2-ethyl-2(hydroxymethyl)-1,3-propanediol and 70% Deionized water to give a saturated solution. The supernatant of this solution was used to prepare a yellow ink. The yellow ink had the following composition:

| INGREDIENT | AMOUNT (GM) |
| --- | --- |
| Yellow pigment dispersion 3 | 10.6 |
| Na, sulfanilic acid solution | 24.0 |
| Deionized water | 5.4 |

Bleed was measured as described in Control 1. Bleed between colors was substantially reduced as compared to the control with no salt and was rated an A–.

Example 3

A magenta and yellow ink were prepared as described in Control 1 except that the salts in the following table were added to the yellow ink. The inks were printed as described in Control 1 and the amount of bleed observed was rated as described in Control 1. Results are shown in Table 1 below.

TABLE 1

| SALT | AMOUNT (%) | BLEED |
|---|---|---|
| Sodium salt of benzene sulfonic acid | 5.0 | B+ |
| Sodium salt of benzene sulfonic acid | 7.0 | A– |
| Sodium salt of benzene sulfonic acid | 10.0 | A |
| Sodium salt of p-Toluene sulfonic acid | 2.0 | B– |
| Sodium salt of p-Toluene sulfonic acid | 4.0 | A– |
| Sodium salt of p-Toluene sulfonic acid | 5.0 | A |
| Sodium salt of sulfanilic acid | 5.0 | C– |
| Sodium salt of sulfanilic acid | 7.5 | B+ |

Control 2

A cyan ink was prepared by mixing the following ingredients:

| INGREDIENT | AMOUNT (GM) |
|---|---|
| Pigment Dispersion 5 | 3.7 |
| 2-ethyl-2(hydroxymethyl)-1,3-propanediol (50% solution in deionized water) | 10.8 |
| Butylmethacrylate/DMAEMA-BzCl quat polymer (10K) (11.2% solution in deionized water) | 8.0 |
| Deionized water | 7.5 |

A magenta ink was prepared by mixing the following ingredients:

| INGREDIENT | AMOUNT (GM) |
|---|---|
| Pigment Dispersion 2 | 6.5 |
| 2-ethyl-2(hydroxymethyl)-1,3-propanediol (50% solution in deionized water) | 10.8 |
| Deionized water | 12.7 |

The cyan and magenta inks were printed in adjacent (?) areas using a Hewlett-Packard 500C printer printing onto Gilbert Bond paper (25% cotton, Mead Co. Dayton, Ohio). Bleed was rated on a scale of A–F with A being the best and F being the worst.

Bleed for this print was rated an F.

Example 4

The inks of Control 2 were used with the following exceptions: the magenta inks was made by mixing the following ingredients:

| | AMOUNT (GM) | |
|---|---|---|
| INGREDIENT | Ink A | Ink B |
| Pigment Dispersion 2 | 6.5 | 6.5 |
| 2-ethyl-2(hydroxymethyl)-1,3-propanediol(50% solution in deionized water) | 10.8 | 10.8 |
| Calcium nitrate (46.4% in water) | 5.2 | |
| p-toluene sulfonic acid, Na salt (34.7% in water) | | 5.2 |
| Deionized water | 7.5 | 7.5 |

Prints were made on both Gilbert Bond and Hammermill paper. Bleed between colors was substantially improved for the cases where the magenta ink contained the salts. Also color saturation on the Hammermill paper was substantially improved. Results are shown in Table 2.

TABLE 2

| MAGENTA ADDITIVE | BLEED RATING GILBERT BOND | COLOR SATURATION ON HAMMERMILL |
|---|---|---|
| none (control 2) | F | poor |
| calcium nitrate | C | good |
| Na, para-toluene sulfonic acid | C | good |

Example 5

Magenta and yellow inks were prepared as described in Control 1 with the following exception: salts in the following table were added to the yellow ink. The inks were printed as described in Control 1 and the amount of bleed observed was rated as described in Control 1. Results are shown in Table 3.

TABLE 3

| YELLOW ADDITIVE | BLEED RATING GILBERT BOND | COLOR SATURATION ON HAMMERMILL |
|---|---|---|
| none | F | poor |
| 4% ammonium bromide | C | |
| 7.5% ammonium bromide | A | |
| 8% Calcium nitrate | B | good |
| 4% sodium nitrate | A– | poor |
| 6% sodium nitrate | A– | good |
| 0.5% ammonium perchlorate | C | poor |
| 1.6% ammonium perchlorate | A | good |
| 3% salicylic acid, Na salt | A | poor |
| 4% p-toluene sulfonic acid, ammonium salt | A | |

Control 3

A magenta ink was prepared by mixing the following ingredients:

| INGREDIENT | AMOUNT (GM) |
|---|---|
| Pigment Dispersion 2 | 6.3 |
| 2-ethyl-2(hydroxymethyl)-1, 3-propanediol (50% solution in water) | 10.8 |
| Deionized water | 12.9 |

A yellow ink was prepared by mixing the following ingredients:

| INGREDIENT | AMOUNT (GM) |
|---|---|
| Pigment Dispersion 4 | 8.7 |
| 2-ethyl-2(hydroxymethyl)-1, 3-propanediol (50% solution in water) | 10.8 |
| Deionized water | 10.5 |

The inks were printed as described in Control 1 and the amount of bleed observed was rated as described in Control 1.

Bleed on Gilbert bond paper was rated an F.

Example 6

Magenta and yellow inks were prepared as described in Control 3 with the following exception: 8% zinc was added to the yellow ink. The inks were printed as described in Control 1 and the amount of bleed observed was rated as described in Control 1. Bleed on Gilbert bond paper was rated an A.

Control 4

A black ink with the following formula is prepared:

| INGREDIENT | AMOUNT (GM) |
| --- | --- |
| Pigment Dispersion 6 | 8.7 |
| 2-ethyl-2(hydroxymethyl)-1,3-propanediol (50% solution in deionized water) | 18.0 |
| Deionized water | 23.3 |

A yellow ink with the following formula is prepared:

| INGREDIENT | AMOUNT (GM) |
| --- | --- |
| Pigment Dispersion 7 | 5.0 |
| 2-ethyl-2(hydroxymethyl)-1,3-propanediol (50% solution in deionized water) | 7.2 |
| Deionized water | 12.8 |

The black and yellow inks are printed in adjacent areas onto Gilbert Bond paper (25% cotton, Mead Co. Dayton, Ohio) and Hammermill paper using a Hewlett-Packard 500C printer. Bleed is rated on a scale of A–F with A being the best and F being the worst.

Results are given in Table 4 below.

Example 7

The black and yellow inks of control 4 are used with the following exception: in the yellow ink 1.0 gm of water is replaced by 1.0 gm of calcium nitrate. The black and yellow ink are printed as described in Control 4. Results are shown in Table 4. It is expected that the control would have a rating of F and the example a rating of A.

Control 5

A magenta ink was prepared by mixing the following ingredients:

| INGREDIENT | AMOUNT (GM) |
| --- | --- |
| Pigment Dispersion 1 | 5.2 |
| 2-ethyl-2(hydroxymethyl)-1,3-propanediol (50% solution in deionized water) | 10.8 |
| Deionized water | 14.0 |

A yellow ink was prepared by mixing the following ingredients:

| INGREDIENT | AMOUNT (GM) |
| --- | --- |
| Pigment Dispersion 4 | 8.7 |
| 2-ethyl-2(hydroxymethyl)-1,3-propanediol (50% solution in deionized water) | 10.8 |
| Deionized water | 14.0 |

The inks were printed as described in Control 1, and the amount of bleed observed was rated as described in Control 1. Bleed on Gilbert bond paper was rated a C.

Example 8

Magenta and yellow inks were prepared as described in Control 5 with the following exception: salts identified in the table below were added to the yellow ink. The inks were printed as described in Control 1 and the amount of bleed observed was rated as described in Control 1. Results are shown in the table below.

| YELLOW ADDITIVE | BLEED RATING ON GILBERT BOND | COLOR SATURATION ON HAMMERMILL |
| --- | --- | --- |
| none (control) | C | poor |
| 2% Na, p-toluene sulfonic acid, 10% zinc chloride | A | good |
| 4% calcium nitrate | B+ | poor |
| 6% calcium nitrate | A– | good |
| 4% aluminum nitrate | B– | good |
| 6% aluminum nitrate | A– | poor |
| 24 Na, p-toluene sulfonic acid | A– | poor |

What is claimed is:

1. An ink set for alleviating bleed in multicolor printed elements comprising a first ink and a second ink of the same ionic character, each ink having an aqueous carrier medium and a colorant, wherein the colorant of the first ink is a pigment dispersion and the second ink contains a salt of an organic acid or mineral acid having a solubility of at least 10 parts in 100 parts of water at 25° C., said salt being present in an amount effective to alleviate bleed between the first and second inks during printing.

2. The ink set of claim 1 wherein said salt is an ammonium salt.

3. The ink set of claim 1 wherein said salt is a metal salt.

4. The ink set of claim 3 wherein said salt is a divalent metal salt.

5. The ink set of claim 3 wherein the metal salt comprises a metal cation selected from the group consisting of $Na^{+1}$, $Li^{+1}$, $K^{+1}$, $Ca^{+2}$, $Cu^{+2}$, $Co^{+2}$, $Ni^{+2}$, $Fe^{+2}$, $La^{+3}$, $Nd^{+3}$, $Y^{+3}$, $Zn^{+2}$, $Mg^{+2}$ and $Al^{+3}$.

6. The ink set of claim 3 wherein the metal salt is selected from the group consisting of NaCl, $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $Zn(NO_3)_2$, $CuCl_2$, $ZnCl_2$, $CoCl_2$, $Co(NO_3)_2$, $NiCl_2$, $MgBr_2$, $Mg(NO_3)_2$, $ZnBr_2$, $NH_4Cl$, $Ni(NO_3)_2$, p-toluene sulfonic acid, Na salt; benzene sulfonic acid, Na salt; and sulfanilic acid, Na salt.

7. The ink set of claim 1 wherein the first and second inks are cationic.

8. The ink set of claim 1 wherein the first and second inks are anionic.

9. The ink set of claim 1 wherein the pigment dispersion comprises a pigment and a polymeric dispersing.

10. The ink set of claim 1 wherein said salt is present in the amount of 0.1 to 15% by weight, based on the total weight of the second ink composition.

11. A process for creating a multicolor printed element having reduced color bleed, comprising:

(a) providing a first ink comprising an aqueous carrier medium and a pigment dispersion colorant;

(b) providing a second ink having the same ionic character as said first ink, said second ink comprising an aqueous carrier medium, a colorant, and a salt of an organic acid or mineral acid having a solubility of at least 10 parts in 100 parts of water at 25° C., said salt being present in an amount effective to alleviate between the first and second inks; and (c) applying the first ink and the second ink in contact with each other on a substrate.

12. The process of claim 11 wherein the salt is an ammonium salt.

13. The process of claim 11 wherein the salt is a metal salt.

14. The process of claim 13 wherein the salt is a divalent metal salt.

15. The process of claim 13 wherein the metal salt comprises a metal cation selected from the group consisting of $Na^{+1}$, $Li^{+1}$, $K^{+1}$, $Ca^{+2}$, $Cu^{+2}$, $Co^{+2}$, $Ni^{+2}$, $Fe^{+2}$, $La^{+3}$, $Nd^{+3}$, $Y^{+3}$, $Zn^{+2}$, $Mg^{+2}$ and $Al^{+3}$.

16. The process of claim 13 wherein the metal salt is selected from the group consisting of $NaCl$, $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $Zn(NO_3)_2$, $CuCl_2$, $ZnCl_2$, $CoCl_2$, $Co(NO_3)_2$, $NiCl_2$, $MgBr_2$, $Mg(NO_3)_2$, $ZnBr_2$, $NH_4Cl$, $Ni(NO_3)_2$, p-toluene sulfonic acid, Na salt; benzene sulfonic acid, Na salt; and sulfanilic acid, Na salt.

17. The process of claim 11 wherein the pigment dispersion comprises a pigment and a polymeric dispersant.

18. The process of claim 11 wherein the first and second inks are cationic ink.

19. The process of claim 11 wherein the first and second inks are anionic.

20. The process of claim 11 wherein the salt of an organic acid or mineral acid is present in the amount of 0.1 to 15% by weight, based on the total weight of the second ink composition.

21. The process of claim 11 wherein the substrate is paper.

* * * * *